(12) United States Patent
Ryzhikov et al.

(10) Patent No.: US 10,504,128 B2
(45) Date of Patent: Dec. 10, 2019

(54) SYSTEMS AND METHODS FOR IMPROVED BILLING AND ORDERING

(71) Applicant: NetCracker Technology Corporation, Waltham, MA (US)

(72) Inventors: Denis Ryzhikov, Calgary (CA); Andrey Verbitskiy, Moscow (RU)

(73) Assignee: NETCRACKER TECHNOLOGY CORPORATION, Waltham, MA (US)

(*) Notice: Subject to any disclaimer, the term of this patent is extended or adjusted under 35 U.S.C. 154(b) by 108 days.

(21) Appl. No.: 15/082,732

(22) Filed: Mar. 28, 2016

(65) Prior Publication Data

US 2017/0053300 A1     Feb. 23, 2017

Related U.S. Application Data

(63) Continuation of application No. 13/077,383, filed on Mar. 31, 2011, now abandoned.

(51) Int. Cl.
| | |
|---|---|
| *G06Q 30/02* | (2012.01) |
| *G06Q 10/00* | (2012.01) |
| *G06Q 30/00* | (2012.01) |
| *G06Q 30/04* | (2012.01) |

(52) U.S. Cl.
CPC ......... *G06Q 30/0206* (2013.01); *G06Q 10/00* (2013.01); *G06Q 30/00* (2013.01); *G06Q 30/04* (2013.01)

(58) Field of Classification Search
CPC .... G06Q 30/0206; G06Q 10/10; G06Q 30/00; G06Q 30/04

USPC ....................... 705/34, 400, 1.1, 412, 36, 26
See application file for complete search history.

(56) References Cited

U.S. PATENT DOCUMENTS

| | | |
|---|---|---|
| 7,260,192 B2 | 8/2007 | Nolting et al. |
| 7,590,581 B1 | 9/2009 | Payne et al. |
| 7,801,783 B2 | 9/2010 | Kende et al. |
| 7,925,554 B1 | 4/2011 | Sirota et al. |

(Continued)

OTHER PUBLICATIONS

Characteristic-Based Pricing and Charging; TM Forum 2010; GB922 Addendum 1R Updates Version 9.5; pp. 1-18.

(Continued)

*Primary Examiner* — Vanel Frenel
(74) *Attorney, Agent, or Firm* — Foley & Lardner LLP (57) ABSTRACT

A price-generation system exemplary of the present invention reduces reliance on synchronization of rating and billing information, simplifies and speeds up commercial implementation of such systems, and reduces computational costs associated with real-time cost calculations by pre-computing rating data that can be automatically applied to subscriber usage. In one embodiment, a price-generation system comprises an analysis component configured to automatically generate at least one rate cube, wherein the at least one rate cube is configured to store rate plan information, an order entry component configured to pre-compute recurring charge information associated with at least one service based on at least a first set of rules, and a billing component configured to calculate total charges based on at least the pre-computed recurring charge information and usage charge information, wherein the usage charge information is calculated using the at least one rate cube.

20 Claims, 11 Drawing Sheets

(56) References Cited

U.S. PATENT DOCUMENTS

| | | | | |
|---|---|---|---|---|
| 8,521,543 B2* | 8/2013 | Chambers | | G06Q 30/04 |
| | | | | 705/1.1 |
| 8,738,546 B2* | 5/2014 | Basak | | G06Q 50/06 |
| | | | | 705/412 |
| 2002/0010670 A1 | 1/2002 | Mosler et al. | | |
| 2002/0026394 A1* | 2/2002 | Savage | | G06Q 20/02 |
| | | | | 705/34 |
| 2003/0110044 A1 | 6/2003 | Nix et al. | | |
| 2004/0088256 A1 | 5/2004 | Klein et al. | | |
| 2005/0149416 A1 | 7/2005 | Benco et al. | | |
| 2006/0172721 A1 | 8/2006 | Dawson et al. | | |
| 2006/0233331 A1 | 10/2006 | Maestas et al. | | |
| 2007/0281663 A1 | 12/2007 | Sandholm et al. | | |
| 2007/0298763 A1 | 12/2007 | Clayton | | |
| 2009/0098854 A1 | 4/2009 | Park et al. | | |
| 2009/0234710 A1 | 9/2009 | Belgaied Hassine et al. | | |
| 2011/0040704 A1* | 2/2011 | Ekker | | G06Q 20/102 |
| | | | | 705/400 |
| 2012/0026394 A1 | 2/2012 | Maruyama | | |
| 2013/0054378 A1* | 2/2013 | Hao | | G06Q 30/04 |
| | | | | 705/14.66 |
| 2013/0117168 A1* | 5/2013 | Sandstrom | | G06Q 30/0283 |
| | | | | 705/34 |
| 2013/0282541 A1* | 10/2013 | Greiner | | G06Q 30/04 |
| | | | | 705/34 |

OTHER PUBLICATIONS

International Search Report and Written Opinion for PCT/US2012/030649; dated Jun. 20, 2012; 9 pages.

Online analytical processing; Wikipedia; retrieved on Jun. 27, 2011 from the Internet <URL: http://en.wikipedia.org/wiki/Online_analytical_processing>; pp. 1-6.

Salomon, Josh, et al.; Introduce the concept and entities of PricingLogicAlgorithm to the information framework; Contribution to the TeleManagement Forum; Team Contribution Form Version 1.2; pp. 1-12; retrieved from the Internet on Mar. 30, 2011.

Zsmart Rating & Billing; ZTE Corporation; retrieved on Jun. 27, 2011 from the Internet <URL: http://wwwen.zte.com.cn/en/products/vas/oss_bss/200709/t20070906_157802.html>; pp. 1-2.

* cited by examiner

Rate Cube

SYSTEMS AND METHODS FOR IMPROVED BILLING AND ORDERING

TECHNICAL FIELD

The present invention generally relates to real-time charge computation and price synchronization in billing and ordering systems.

BACKGROUND OF THE INVENTION

Rating and billing processes generally require synchronization between systems to allow information to be processed uniformly throughout the order and billing process. Many modern Operation Support Systems (OSS)/Business Support Systems (BSS) implementations have Order Entry and Billing platforms that are supplied by different vendors. The most common approach involves real-time requests for information between the systems every time pricing information is needed, with one system containing the master copy of pricing or rating data. Doing so, however, requires substantial implementation effort and processing time because components for placing orders and processing user activity must continually synchronize their pricing information to ensure that charges are being applied properly. Since the systems may be provided by different vendors, pricing data models also may vary significantly between the systems, making pricing synchronization a challenge, especially when using complicated or extensive pricing rules. Additionally, billing systems currently require substantial computation resources due to the magnitude of calculations required to process users' subscription and usage information as the data is generated. Thus, a need exists in the art for an improved billing and ordering system.

SUMMARY OF THE INVENTION

A price-generation system exemplary of the present invention reduces reliance on synchronization of rating and billing information by dividing rules associated with different charging types into different processing components. An order entry component may process certain rating information independently, without relying on an associated billing component. This improved system reduces the amount of information that is synchronized between processing components to generate users' billing information.

Another advantage is associated with pre-calculating information to reduce the computational costs of generating billing information in real time. For example, certain information may be generated using estimated or historical user data, which eliminates the need for manual calculations before real usage data is available for rate generation. Rate cube data structures also may be generated automatically for certain rates, which reduces reliance on manual calculations to generate billing information.

Additional advantages may be obtained using statistical analysis to refine estimated or pre-calculated rate and user data to refine the estimates based on real usage.

According to one embodiment of the present invention, a computer-implemented price-generation system may include an analysis component configured to automatically generate at least one rate cube, an order entry component configured to pre-compute recurring charge information associated with at least on service based on at least a first set of rules, and a billing component configured to calculate total charges based on at least pre-computed recurring charge information and usage charge information. In one example, the at least one rate cube is configured to store rate plan information. In another example, the usage charge information is calculated using the at least one rate cube. In another example, the first set of rules and a second set of rules are not synchronized.

According to another feature of the present invention, the analysis component may be configured to determine whether rate data may be pre-calculated. The analysis component may also be configured to pre-fill at least part of at least one rate cube, according to another feature. In another feature of the present invention, at least one rate cube is filled using statistical information related to at least one of a subscriber or rate plan information.

According to another feature of the present invention, the order entry component may be configured to transform at least one rate plan into an optimized form. The order entry component may be further configured to transmit the optimized form of at least one rate plan to the billing component, according to another feature of the present invention.

According to another feature of the present invention, the analysis component may be configured to locate at least one stored rate cube. In another example, service data may be related to at least one of television service, home phone service, Internet service, or wireless phone service.

Another embodiment of the present invention provides a computer-implemented price generation method for analyzing whether rate data may be pre-calculated, generating at least one rate cube for storing rate plan information, transforming at least one rate model into an optimized form, calculating usage charges using at least one rate cube, and combining non-usage charges and usage charges, where the non-usage and usage charges are computed independently.

According to another embodiment of the present invention, analyzing whether rate data may be pre-calculated comprises identifying a rate and subscriber pair that may be pre-calculated. In another embodiment, rate data may be pre-calculated based on test data or historical data. In still another embodiment, at least one rate cube may be filled using statistical information, where the statistical information may include subscriber usage information.

Another feature of the present invention comprises locating at least one rate cube using a hash value. According to another feature of the present invention, combining recurring charges and usage charges further comprises receiving pre-calculated recurring charge information. Still another feature of the present invention comprises computing in real time total charge information based at least in part on estimated usage charge data. According to another feature of the present invention, at least one rate cube comprises a multi-dimensional OLAP cube associated with at least one of a service or subscriber.

In another embodiment of the present invention, a non-transitory computer-readable medium having computer-readable instructions stored thereon causes a computer to analyze whether rate data may be pre-calculated, generate at least one rate cube for storing rate plan information, transform at least one rate model into an optimized form, compute usage charges using the at least one rate cube, and combine recurring charges and usage charges. In one example, recurring charges and usage charges are computed independently.

Other aspects and features of the present invention will become apparent to those of ordinary skill in the art upon review of the following description of specific embodiments of the invention together with the accompanying figures.

BRIEF DESCRIPTION OF THE DRAWINGS

For a more complete understanding of the present invention and the advantages thereof, reference is now made to the to the following descriptions in conjunction with the accompanying drawings, in which.

DETAILED DESCRIPTION OF THE PREFERRED EMBODIMENTS

In the following description, numerous specific detail are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Referring now to the drawings, depicted elements are not necessarily shown to scale, and like or similar elements are designated by the same reference numeral through the several drawings.

Figure 1:
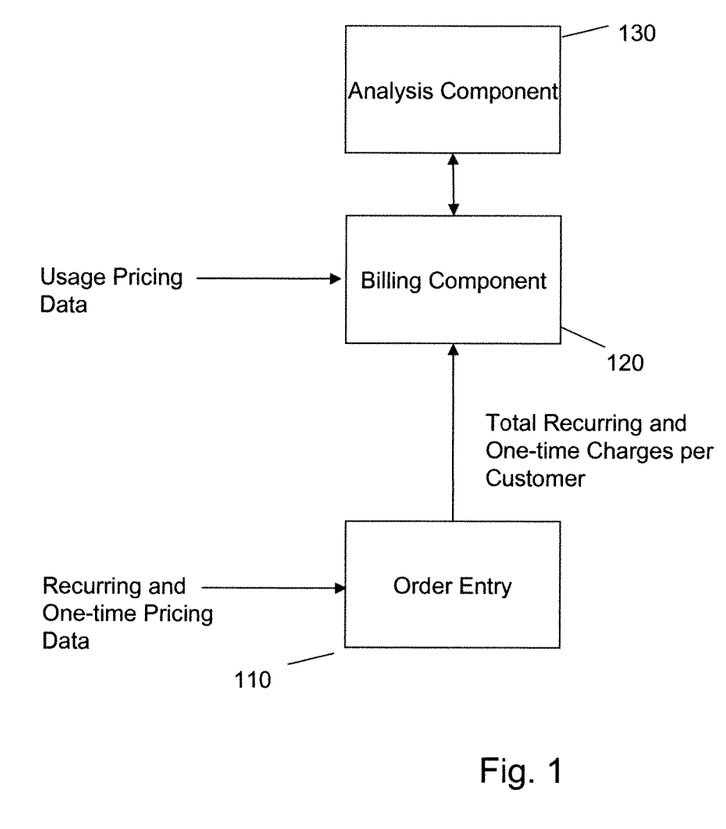
FIG. 1 is a block diagram overview of an exemplary embodiment of the present invention.

FIG. 1 illustrates exemplary functional components of a price-generation system 100. Price-generation system 100 includes an order entry component 110, a billing component 120, and an analysis component 130. The order entry component 110 is operatively connected to the billing component 120 and analysis component 130 and stores and retrieves recurring and one-time rate information. In one embodiment, the order entry component 110 provides detailed order quote information based on billing and rate plan information to potential and existing customers regarding services corresponding to billing information stored by price-generation system 100. Furthermore, order entry component 110 stores rate plan information and rules related to recurring charges that may be pre-calculated to generate charge information. Order entry component 110 stores such rate information without synchronizing it with information stored by other components of price-generation system 100, such as billing component 120. In one embodiment, for usage-based rate plans, the order entry component 110 contains text-based rate plan information that may be displayed to a user for selection. This information may also include a reference to additional usage-based rate information stored by billing component 120. The reference between the components is a placeholder designed to provide information regarding billing rules that are applied by billing component 120.

Billing component 120 is operatively connected to order entry component 110 and analysis component 130 as shown in FIG. 1. In one embodiment, the billing component is configured to calculate usage-based billing charges associated with various rate plans. The usage charges may also be combined with other pre-calculated billing information, such as pre-calculated recurring and one-time charge information or estimated rate information, to calculate a total charge based on at least recurring or one-time charge information and usage information. Billing component 120 may be configured to receive charge information or analysis information from at least one other component, such as the order entry component 110 or analysis component 130, to facilitate generating total charge information without synchronizing rate information.

In an exemplary embodiment, the billing component 120 uses at least one rate cube to generate billing information. In an exemplary embodiment, the at least one rate cube is an Online Analytical Processing (OLAP) cube configured to contain rate and billing information. The structure of an exemplary rate cube is illustrated below in FIG. 4. It will be appreciated by those skilled in the art that the invention is not limited to the specific information shown in FIG. 4. The information stored may be related to, for example, estimated data, statistically generated information, or historical data that allows the billing component 120 to generate a total charge. Using pre-computed data stored in the at least one rate cube allows billing component 120 to calculate billing information in real time before subscribers' actual data has been collected and processed.

Analysis component 130 is configured to process rules and customer details to generate rate cubes for billing processing. In particular, the analysis component 130 analyzes rate information to determine which combinations of user information and service information must be calculated traditionally and which may be calculated automatically. In one embodiment, the analysis component 130 determines whether rating information may be calculated using rate cubes or by comparison with other rating information. In situations where rate data may be calculated using a rate cube, the analysis component 140 may generate data to fill at least part of a rate cube to calculate billing information for one or more specific rate plans or subscribers. In another embodiment, however, the analysis component 130 may not precalculate data for at least one rate cube; instead, one or more rate cubes may be free of data before rating calculations begin. Such rate cubes may be filled with rating data based on calculations using actual subscriber data in real time.

Figure 2:
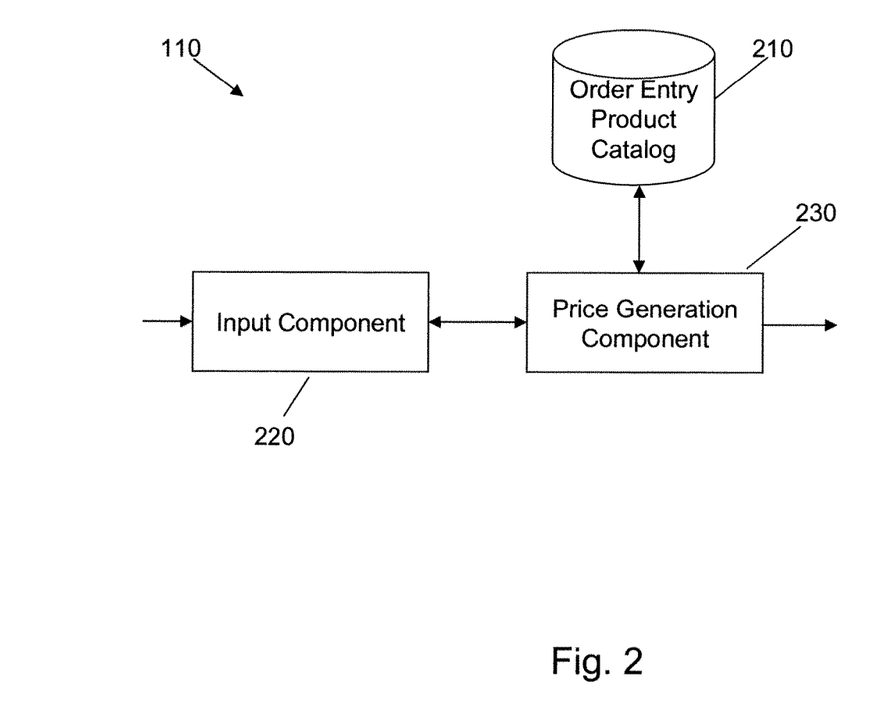
FIG. 2 is a block diagram illustrating an Order Entry component according to an embodiment of the present invention.

FIG. 2 shows the order entry component 110 in greater detail. In particular, FIG. 2 shows an order entry product catalog 210, an input component 220, and a price generation component 230. The order entry product catalog 210 is configured to store information related to various subscription rates and billing details. In one embodiment, the order entry product catalog 210 contains details related to recurring and one-time charges associated with one or more data rate plans. These stored details may include pricing and plan information, such as conditions related to the application of such pricing terms. For example, recurring charge information may relate to television, home phone, Internet, or wireless phone service.

In one example, a plan stored in the order entry product catalog 210 may relate to high-speed internet. The Regular price may be $50/month, a Bundled price may be $40/month, and a Promotional price may be $0/month may apply for the first month, then $20 for the next six months, then revert to regular price thereafter. In one embodiment, this information may be stored in a form that can be processed by a computer, such as a markup language like the eXtensible Markup Language (XML), that represents these price and timing aspects. As formatted, the information described in the example above may be stored in the order entry product catalog as:

```
<HighSpeedInternet startDate="1 Feb 2011" price="$0"
endDate="28 Feb 2011">
<HighSpeedInternet startDate="1 Mar 2011" price="$20"
endDate="31 Aug 2011">
<HighSpeedInternet startDate="1 Sep 2011" price="$50" endDate="">
```

As such, the information is accessible through the order entry product catalog 210 in a precomputed form, where the pricing has already been established for specified periods of time. In one embodiment, the stored information may be provided to the billing component 120 for processing such that synchronization of the underlying pricing rate data between the order entry component 110 and billing component is not necessary. Instead, the billing component 120 receives precalculated pricing information that can be used to calculate the subscriber's total bill.

The price generation component 230 facilitates generation of a price for subscribers and rate plans. In one embodiment, the price generated may be based on information received from order entry product catalog 210. Billing information generated by the price generation component 230 together with the order entry product catalog 210 allows the order entry component 110 to generate a contracted price that may be specific to one or more subscribers. More specifically, the price generated by the price generation component may include price override information that includes specific terms that affect only certain subscribers. The price data, including any other information related to the price may be presented as a price quote to a user or may be used for further billing processing by the order entry component 110 or billing component 120.

Figure 3:
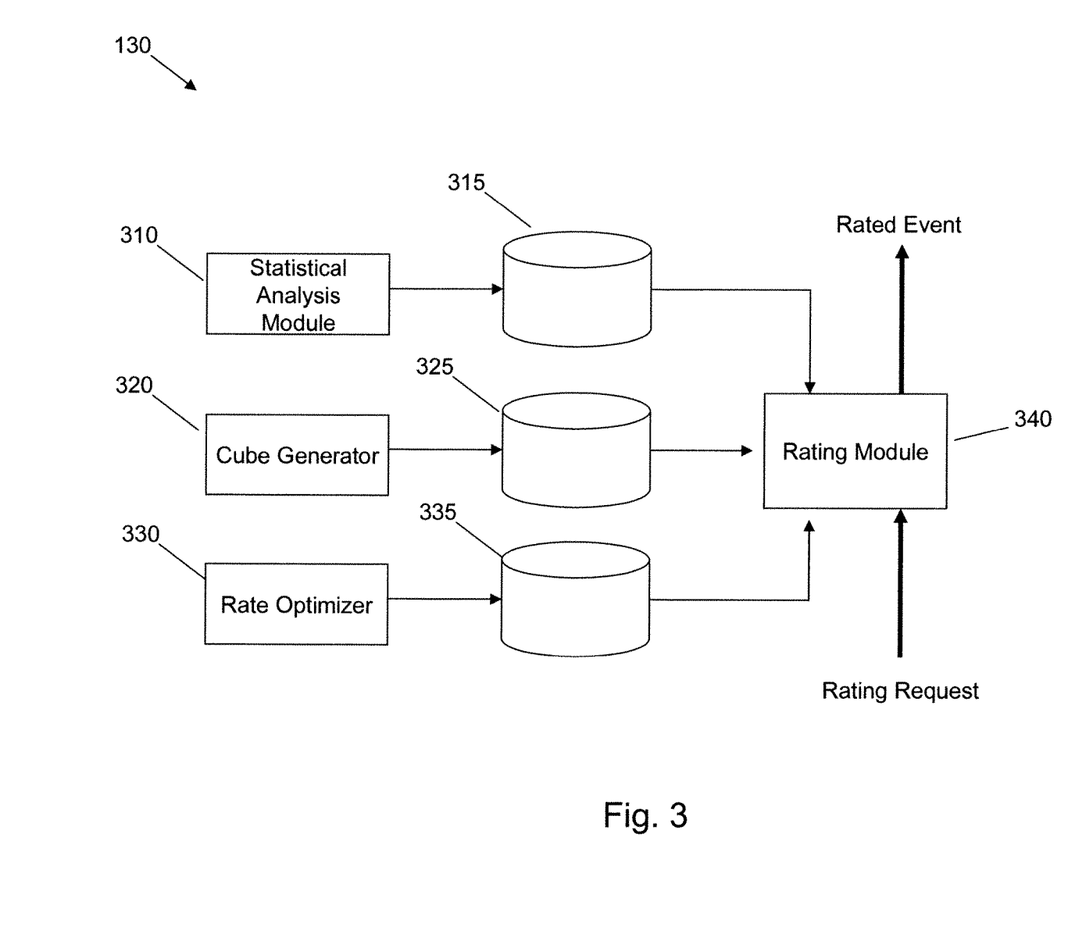
FIG. 3 is a block diagram showing the Analysis component according to an embodiment of the present invention.

FIG. 3 illustrates additional details of the analysis component 130. More specifically, FIG. 3 illustrates a statistical analysis module 310, a cube generator 320, a rate optimizer 330, and a rating module 340. The statistical analysis module 310 facilitates subscription rating by analyzing user data and subscription data. In one embodiment, the statistical analysis module 310 analyzes a services usage model stored in a database 305 that is operatively connected thereto. The database may be configured to store service data and hash data to facilitate retrieval during the billing and rating process. The statistical analysis module 310 also analyzes subscriber data. In one embodiment, the statistical analysis module 310 analyzes whether particular subscribers prefer to use base rates or rarely change rate data to determine whether the subscriber data may be further optimized. In addition, the statistical analysis module 310 may analyze rate data and existing rate cubes that may be related to particular subscribers or rate data. Furthermore, the statistical analysis component 310 may be configured to analyze data manually or automatically. In one embodiment, the statistical analysis component 310 may be programmed to automatically perform a data analysis when certain rating events occur. For example, the statistical analysis component 310 may perform an analysis if rate data changes or if the rate plan associated with one or more subscribers changes. The statistical analysis and optimization functions contemplated herein to analyze and optimize data include techniques well-known to one of ordinary skill in the art.

The cube generator 320 is configured to form rate cubes for rate models and to store rate cubes in database 325. Rate cubes stored in database 325 may include data related to individual subscribers along with data related to the rate model to provide a pairing between the rate model and the subscriber. In an embodiment, the calculated rate cubes may correspond to rates that are used most often for current subscribers.

A rate cube generated by cube generator 320 may contain rate data and a hash table that provides access to the cube during the rating process. The hash function allows for fast rate cube identification. The hash function is related to the model used to create one or more rate cubes, such as a subscriber-based model or service-based model. In one example, if an individual rate cube is associated with a particular service, the hash function may hash a service ID associated with the service to generate a key value used to identify and locate the cube. However, it would be understood to one having ordinary skill in the art that other hashing techniques are possible, including using other models associated with rating information to generate rate cubes and hash tables to provide fast rate cube lookup. In one embodiment, the rate cube may be located using the hash table during the rating process without additional processing by hashing information, such as the service ID, to locate a rate cube within the hash table.

As part of the cube generator 320, rate cube data may be pre-calculated. In one embodiment, rate cube data may be pre-calculated using special test data for common rates. In this embodiment, the rate cube may be partially filled with pre-calculated data. The remainder of the rate cube is filled with rate data generated from calculations using real subscriber data. In another embodiment, the rate cube data may be pre-calculated using historical subscriber data to partially fill at least one of the rate cubes.

If rate cube data is not pre-calculated, however, rate cubes may remain empty before rating calculations begin. In one embodiment, rate cubes are filled following a first request and calculations related to the request, such that the information stored in the rate cubes may be used for subsequent requests.

The cube generator 320 may also recalculate stored rate cube data that corresponds to subscribers or rates. In one embodiment, cube generator 320 is configured to periodically recalculate rate cube data. The cube generator 320 may also be configured to recalculate rate cube data in response to changes in subscriber information. For example, the cube generator 320 may recalculate stored rate cube data following a change in rates or a change in subscriptions. In another embodiment, the cube generator 320 is configured to analyze statistical changes in subscribers' usage models to determine whether rate cube data should be recalculated.

FIG. 3 also depicts an embodiment of a rate optimizer 330 that is configured to transform rate model information into a calculation-optimized form. Certain rate model information cannot be stored as part of one or more rate cubes, but rate optimizer 330 transforms and stores that information in database 335. In an exemplary embodiment, the rate optimizer 330 directly optimizes executable code to transform the rate model information. Transformed rate model information may be used as part of the overall rate calculation, as will be described in further detail with reference to rating module 340.

Rating module 340 is configured to rate at least one billing event and is operatively coupled to the cube generator 320 and statistical analysis module 310 to facilitate efficient rating. In particular, the rating module may receive at least one billing event and is configured to determine whether a recommended rating already exists. In one embodiment, the rating module may search using a hash code associated with at least one subscriber or service to determine whether a matching hash code already exists, corresponding to an existing rating.

The rating module is further configured to extract rating data from one or more rate cubes related to the particular subscribers or services requested. In one embodiment, the rating module provides information related to the processing of the rate cube and data stored therein to the statistical analysis module and cube generator to facilitate further optimization of the rate cubes and stored rating data.

In another embodiment, the rating module 340 may determine that rate cubes containing the rating data do not already exist for the subscriber and/or the service requested as part of the billing event. In that case, the rating module 340 may facilitate calculating data related to the billing event that is used to generate one or more rate cubes, and the calculated data may also be provided to the statistical analysis module 310, which is configured to analyze the data as discussed previously.

Figure 4:
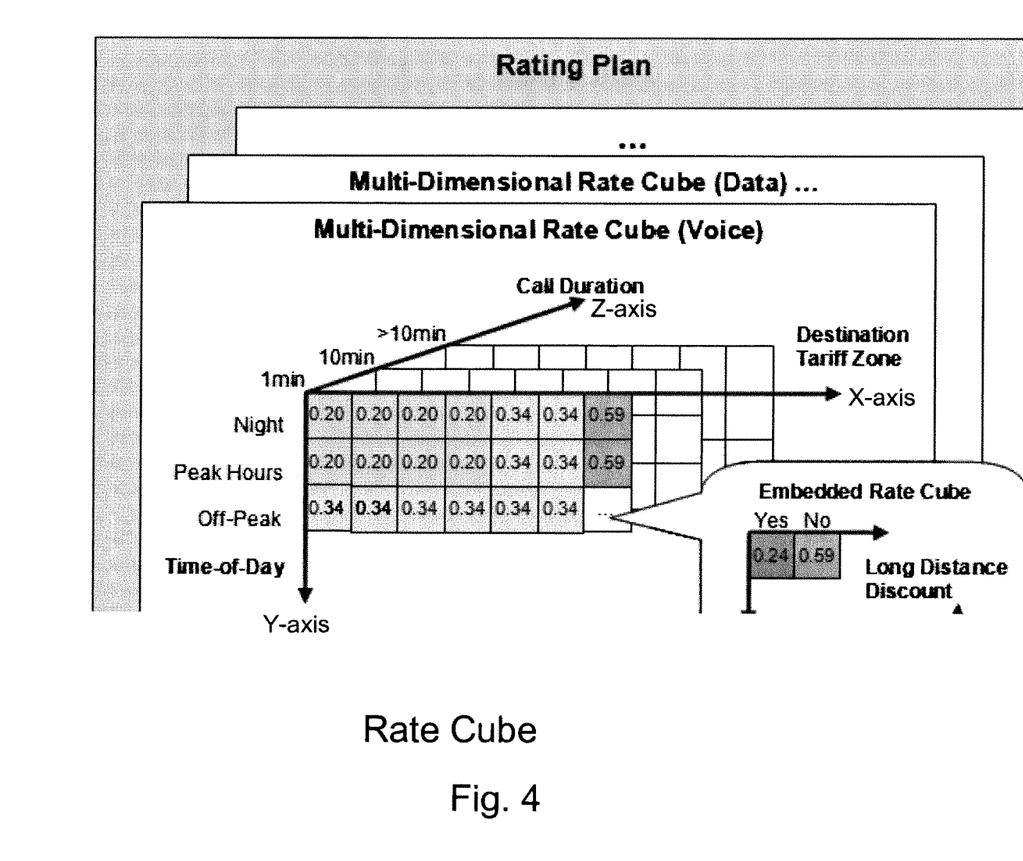
FIG. 4 illustrates an exemplary Rate Cube according to an embodiment of the present invention.

FIG. 4 depicts a rate cube associated with a commonly used rate plan and a group of subscribers. As shown, the rate cube has been partially pre-filled with data. In particular, the rate cube is multi-dimensional to represent a variety of rate plan data. For example, as shown in the rate cube corresponding to a voice service, the x-axis dimension of the cube corresponds to charges based on the destination zone of the voice call. The y-axis dimension in the example illustrates the variation in rate plan information based on the time of day when the voice call takes place. Finally, the z-axis dimension of the illustrated rate cube corresponds to the duration of the voice call. As illustrated in exemplary rate cube, the usage charge associated with the voice call changes as the characteristics of the voice call. For example, a 1 min call made at Night has the same rate as a call made at Peak Hours for the first four destination zones for the call. Similar information may be stored in the rate cube for other call durations, such as 10 min and greater than 10 min, as shown. As shown in the FIG. 4, a multidimensional rate cube may also include one or more embedded rate cubes that correspond to additional rating options for services associated with the particular rate cube. As illustrated in the exemplary embedded rate cube depicted, if the multidimensional rate cube pertains to voice rate information, an embedded rate cube may contain information regarding possible discount rates for long distance calls in certain rate plans. FIG. 4 also depicts another multi-dimensional rate cube corresponding to a data service associated with the rate plan. It is to be understood that the rate cube corresponding to the data service associated with the rate plan contains similar features to those described above with respect to the voice service.

Figure 5:
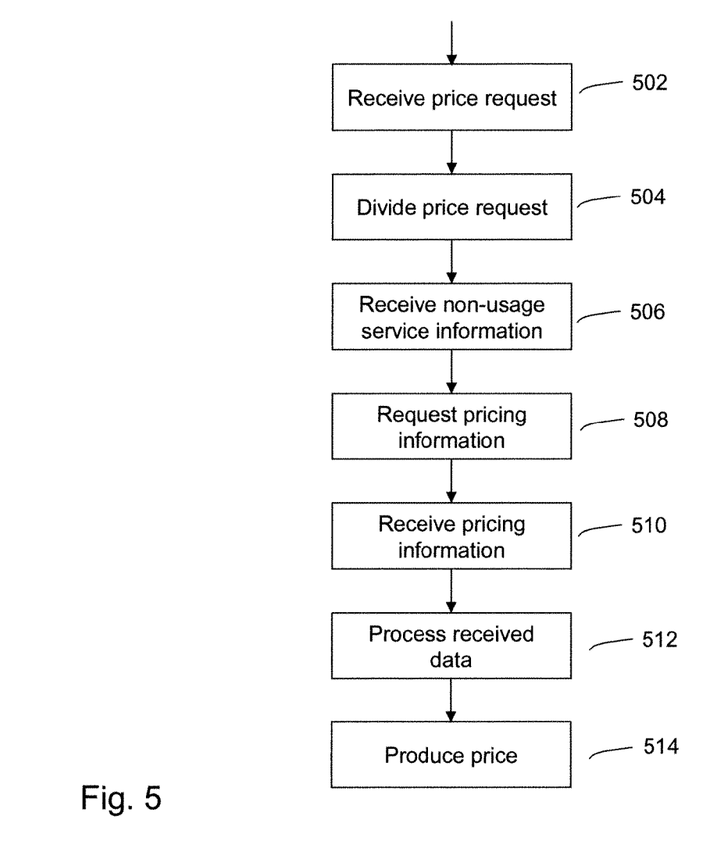
FIG. 5 is a flow diagram illustrating processing of a request for pricing.

FIG. 5 shows a method associated with processing a request for pricing information that is exemplary of an embodiment of the present invention. As shown previously in FIG. 2, the order entry component 110 processes requests for pricing. At 502, a request for price is received. An exemplary request may include charges related to usage-based services, for example a price-per-Gigabyte of data or price-per-minute for a voice call, and to recurring or one-time service charges, such as a monthly subscription charge for Internet service or a price to purchase necessary hardware. At 504, the request for pricing may be divided into separate requests associated with the non-usage and usage charge types. At 506, the input component 220 receives the charge information associated with non-usage services. At 508, pricing information is requested from the order entry product catalog 210. At 510, pricing rule information associated with the requested non-usage service is received from the order entry product catalog 210 by price generation component 230. At 512, the order entry component 110 processes data received from the order entry product catalog 210 and non-price information from the billing component 120 related to the request for pricing. In one embodiment, the non-price information received from the billing component 120 related to the request for pricing is descriptive information regarding usage rates. At 514, the order entry component 110 produces a price associated with the rate plan associated with the request, which may be presented to a subscriber who can order the rate plan.

Figure 6:
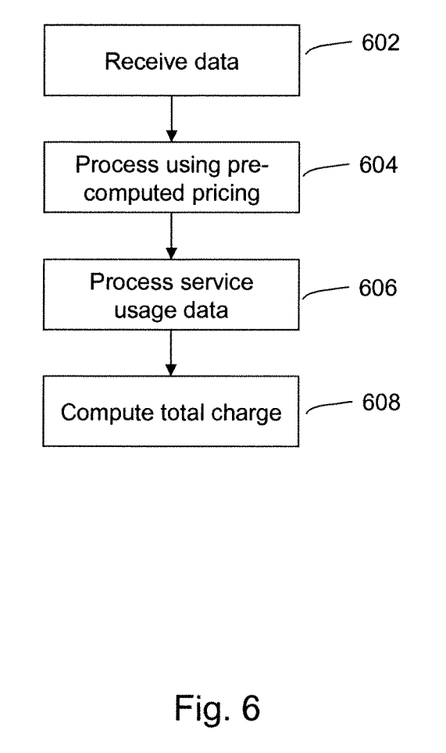
FIG. 6 is a flow diagram showing one embodiment of a charging process.

FIG. 6 shows a charging process associated with rate plan usage by subscribers. At 602, service usage event data and non-usage event service data are received by price-generation system 100. At 604, the non-usage service data is processed based on pre-computed pricing points previously generated by order entry component 110. At 606, service usage data is processed according to pricing rules stored by billing component 120. As discussed previously with respect to billing component 120, service usage data may be processed based on calculated data or actual data, or some combination thereof. At 608, a total charge is computed based on the processed service usage data and non-service usage data.

Figure 7:
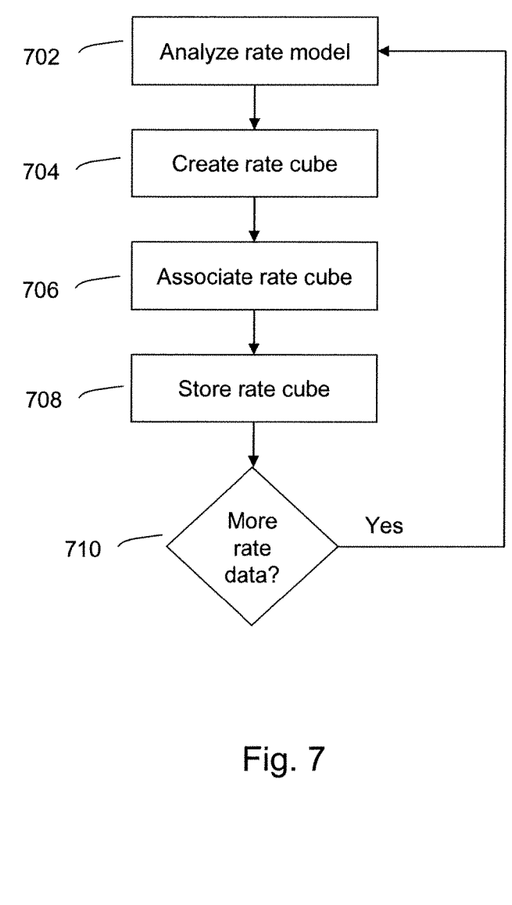
FIG. 7 is a flow diagram illustrating a process of forming a rate cube.

FIG. 7 is a flowchart for forming a rate cube in accordance with an illustrative embodiment. The process in FIG. 7 is executed by the analysis component 130, as shown in FIG. 3. At 702, the process begins by analyzing the rate model of one or more subscribers. If the rate model is determined to be the same for the one or more subscribers, at 704, a rate cube data structure is created. An exemplary rate cube may be a rate cube such as the one illustrated in FIG. 4.

At 706, the rate cube is associated with a group of the one or more subscribers that have a common rate model. The rate cube, thus, includes subscriber, rate plan, and hash code information to facilitate retrieval and processing. Following the association of the rate cube, the rate cube is stored at 708. The process may be repeated for additional subscribers or groups of subscribers, so at 710, the process is returns to 702 for the processing of other rate models.

Figure 8:
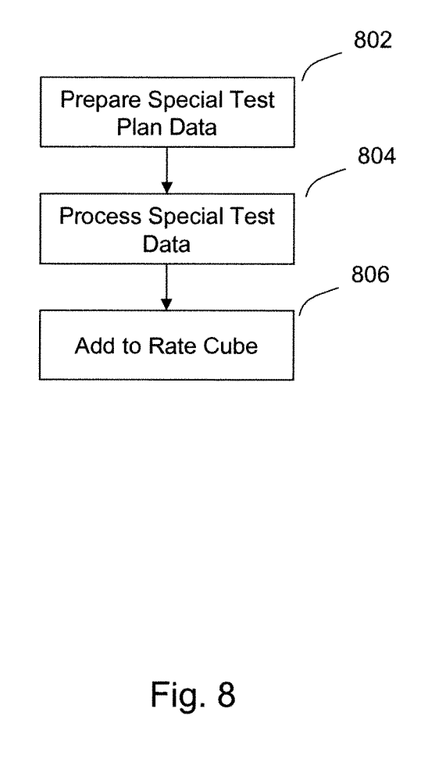
FIG. 8 is a flow diagram illustrating a process for filling a rate cube.

FIG. 8 shows a process for filling a rate cube. At 802, special test plan data associated with certain common rate data is prepared and selected for processing by the analysis module 130. The special test plan data provides an accurate estimate of actual data associated with a particular rate plan. At 804, a special instance of a rating and charging module is instantiated to process the special test data. By processing the special test plan data using a separate module that executes in parallel with the billing component 120, the special instance rating and charging module does not interfere with actual billing processing performed by the billing module 120, which aids in efficient real-time data processing. At 806, the special test data computed to estimate actual data is added to at least one rate cube corresponding to the rate plan. The estimated data allows the special rating and charging module to at least partially pre-fill the rate cube with data to facilitate real-time billing.

Figure 9:
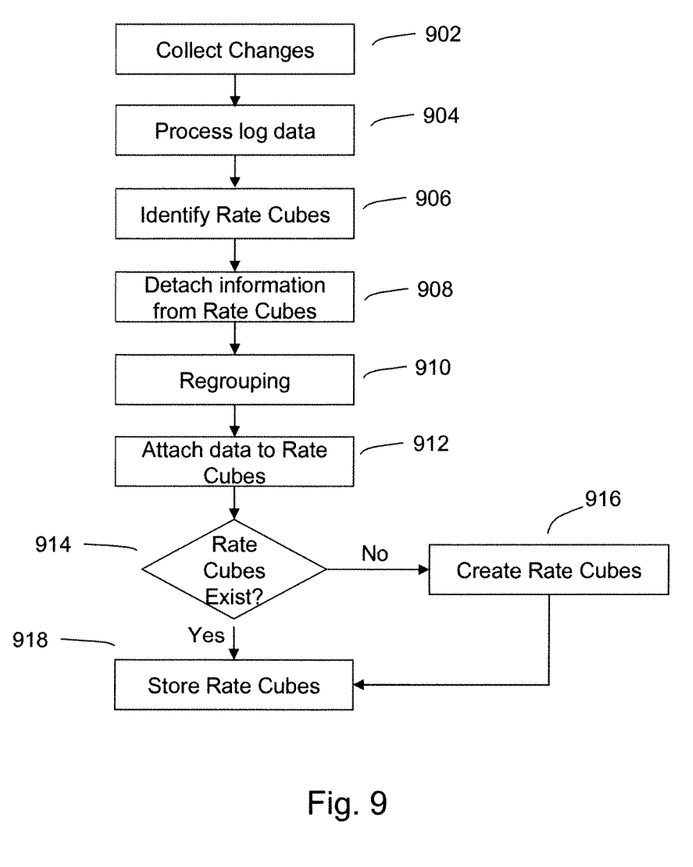
FIG. 9 is a flow diagram depicting a process of updating a rate cube.

FIG. 9 shows a process for updating a rate cube. At 902, changes are collected regarding at least one of subscriber information or rate plan information. At 904, log information is processed. At 906, rate cubes associated with the changed information are identified. At 908, changed information is detached from the rate cubes. At 910, subscribers and rate plans are regrouped based on the changed data. At 912, subscribers and rate plan data is attached to existing rate cubes. At 914, if the changed data does not correspond to existing rate cubes, the method proceeds to 916 to create new rate cubes. If rate cubes corresponding to the changed data already exist, the method continues to 918. At 918, if new rate cubes were created based on the changed data, the new rate cubes are stored.

Figure 10:
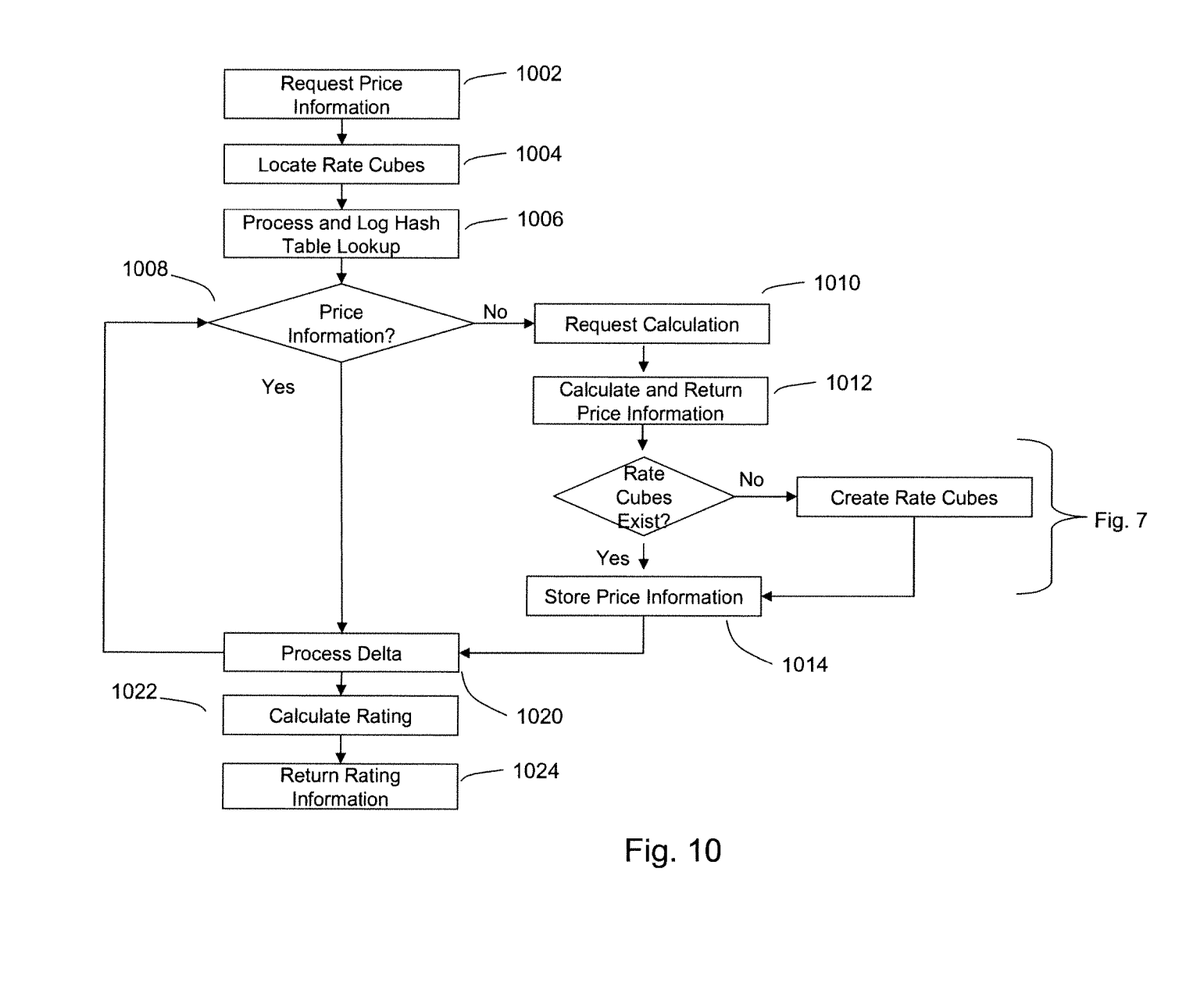
FIG. 10 is a flow diagram illustrating a process for providing rating information.

FIG. 10 shows a process for providing rating information in connection with subscriber billing and charging. At 1002, price information is requested from the rating module for a subscriber. The request may include price information and delta information corresponding to a balance amount associated with the subscriber's account. At 1004, the rating module requests price information by attempting to locate rate cubes associated with the subscriber or rate information. At 1006, the rating module processes the result of the hash table lookup, and the details of the lookup may be logged. At 1008, if the lookup returned price information, the method proceeds to step 1020. Otherwise, the process proceeds to step 1010, as shown.

At 1010, since price data did not already exist, the rating module requests a calculation of price information based on the rate plan information and subscribers. At 1012, the price is calculated and returned to the rating module. Since the newly calculated price information is not already stored in a rate cube, at 1014 the price information is stored in a rate cube. If the rate cube does not already exist, the rate cube may be created, as shown in FIG. 7 before storing the price information.

At 1020, the rating module processes information related to the delta associated with the subscriber's balance. If price information is not contained in a rate cube or if no cube exists, the process returns to step 1010.

At 1022, the rating associated with the delta may be calculated according to price contained in the rate cube corresponding to the delta.

At 1024, the rating information associated with the price and the delta are returned.

Figure 11:
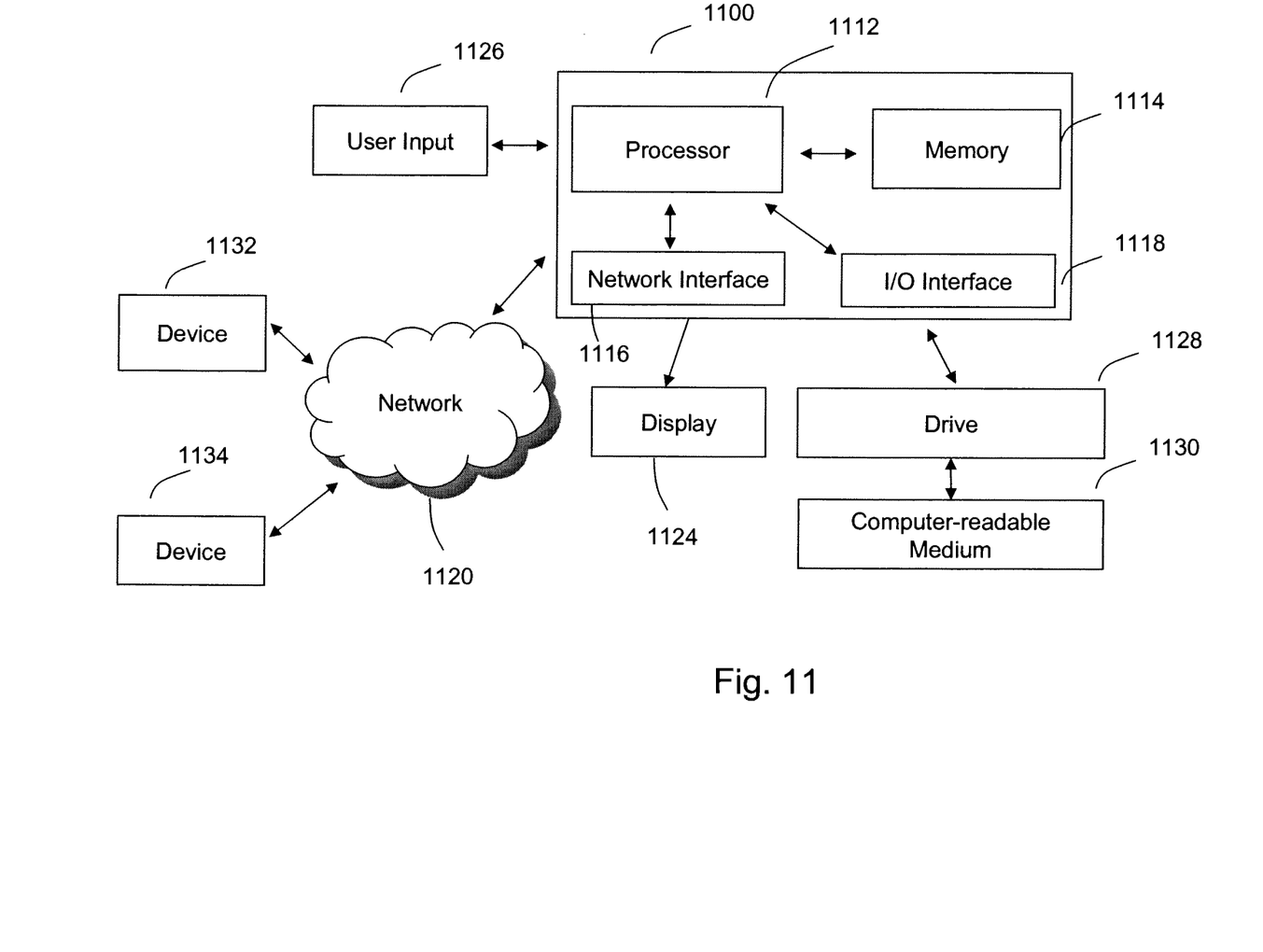
FIG. 11 is a block diagram of an exemplary networked computing environment.

A simplified hardware architecture of an example computing device 1100 configured to implement an embodiment of the present invention is schematically illustrated in FIG. 11. Device 1100 could, for example, be an Intel x86 based computer acting as a network server, workstation, personal computer or the like. Device 1100 includes at least one processor 1112, in communication directly or indirectly through a system bus (not shown) with computer storage memory 1114, network interface 1116, and input output (I/O) interface 1118. Device 1100 may optionally include a display 1124 and user input device 1126 or the like. Processor 1112 is typically a conventional central processing unit and may be any suitable processor known to those skilled in the art. Computer storage memory 1114 includes a suitable combination of random access memory (RAM), read-only-memory (ROM), and disk storage memory used by device 1100 to store and execute software programs adapting device 1100 to function in manners exemplary of the present invention. Drive 1128 is capable of reading and writing data to or from a computer readable medium 1130 used to store software and data to be loaded into memory 1114. Computer readable medium 1130 may be a Digital Versatile Disc (DVD), Compact Disc ROM (CD-ROM), Compact Disc Rewritable (CD-RW), diskette, tape, ROM-Cartridge or the like. Input/output devices, such as user input device 1126, include but are not limited to keyboards, displays, pointing devices, etc. and can be coupled to the system either directly or through intervening I/O controllers or interfaces, such as I/O interface 1118.

Network interface 1116 is any interface suitable to physically link device 1100 to network 1120. Interface 1116 may, for example, be an Ethernet or wireless interface that that may be used to pass data from and to network 20 or another suitable communications network. Network adapter 1126 may also be coupled to the system to enable the device 1100 to become coupled to other data processing systems or remote printers or storage devices through intervening private or public networks. Devices 1132 and 1134 may be other servers, workstations, personal computers, or other computing devices configured to communicate with device 1100 via network 1120. The hardware architectures of other computing devices, such as devices 1132 and 1134, are to be used by way of examples, individually or networked together, and are materially similar to that of device 1100, and will therefore not be further detailed.

Certain embodiments of the invention may relate to a BSS solution, wherein the components and methods described herein may be part of the BSS stack for order processing and billing. These embodiments may replace one or more existing components of an existing BSS solution. For example, a rating and charging component of an existing solution may be replaced with certain features of the present invention. Also, the features of the present invention added to the existing solution may be configured to communicate information with components of the existing solutions to facilitate functions such as billing and order entry processing. Similarly, components of the existing BSS solution may be configured to communicate information with components of the present invention.

Certain features of the invention described herein may support increased efficiency with rating and charging to allow for more effective real time charging. These and other features of the invention may provide substantial computation and hardware savings by pre-calculating common rate information used by a large number of subscribers, which can reduce the amount of calculation done in real-time to produce charging information. In certain embodiments, the savings associated with implementations involving the present invention may be over 50% compared to traditional BSS systems. Using these embodiments of the present invention also makes distributed cloud-based rating possible due to reduced processing and response times.

Embodiments of the invention are also advantageous because they simplify the implementation process for BSS solutions that provide order entry and billing functions. Eliminating the need for synchronization between these components reduces the overall complexity of the implementation process and substantially reduces the costs associated with implementing such systems.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented price-generation system, comprising:
    one or more processors; and
    a memory, the memory storing instructions, which when executed by the one or more processors, causes the one or more processors to
        identify, from the request to perform the billing event, a subscriber and a rate plan associated with the billing event;
        determine that a rate cube for the subscriber or the rate plan does not exist;
        automatically generate at least one rate cube responsive to determining that the rate cube for the subscriber or the rate plan does not exist, wherein the at least one rate cube has a plurality of dimensions and is configured to store rate plan information, wherein the at least one rate cube comprises at least one value of pre-computed rate cube data at a dimensional location in the at least one rate cube based on the plurality of dimensions, a first dimension of the plurality of dimensions corresponding to a duration, a second dimension of the plurality of dimensions corresponding to a time period, wherein at least part of the at least one rate cube is pre-filled using statistical information related to at least one of the subscriber or the rate plan, wherein the rate cube includes a hash table corresponding to a hash function that utilizes a service identifier associated with a service to which the subscriber has subscribed to generate a key value used to identify the rate cube;
        pre-compute recurring charge information associated with at least one service based on at least a first set of rules;
        calculate total charges based on at least the pre-computed recurring charge information and usage charge information, wherein the at least one value of pre-computed rate cube data from the dimensional location is retrieved for at least one usage charge of the usage charge information, wherein retrieving the at least one usage charge comprises using a duration associated with the at least one usage charge as a first index for the first dimension of the plurality of dimensions and using a time period associated with the at least one usage charge as a second index for the second dimension of the plurality of dimensions; and
        generate a bill responsive to the request to perform the billing event.

2. The computer-implemented price-generation system of claim 1, wherein the first set of rules and a second set of rules for the billing component are not synchronized.

3. The computer-implemented price-generation system of claim 1, wherein the memory storing further instructions, which when executed by the one or more processors, further causes the one or more processors to determine whether rate data may be pre-calculated.

4. The computer-implemented price-generation system of claim 1, wherein the memory storing further instructions, which when executed by the one or more processors, further causes the one or more processors to transform at least one rate plan into an optimized form.

5. The computer-implemented price-generation system of claim 4, wherein the memory storing further instructions, which when executed by the one or more processors, further causes the one or more processors to transmit the optimized form of the at least one rate plan to the billing component.

6. The computer-implemented price-generation system of claim 1, wherein the memory storing further instructions, which when executed by the one or more processors, further causes the one or more to locate at least one stored rate cube.

7. The computer-implemented price-generation system of claim 1, wherein the at least one service is at least one of television, home phone, Internet, or wireless phone service.

8. The computer-implemented price-generation system of claim 1, wherein the at least one rate cube comprises at least one OLAP cube.

9. A computer-implemented price-generation method, comprising:
    receiving, by one or more processors, a request to perform a billing event;
    identifying, by the one or more processors, from the request to perform the billing event, a subscriber and a rate plan associated with the billing event;
    determining, by the one or more processors, that a rate cube for the subscriber or the rate plan does not exist;
    analyzing, by the one or more processors, whether rate data may be pre-calculated;
    generating, by one or more processors, responsive to determining that the rate cube for the subscriber or the rate plan does not exist and that rate data may be pre-calculated, at least one rate cube for storing rate plan information with at least one value as pre-computed rate cube data at a dimensional location, wherein the at least one rate cube includes a plurality of dimensions for identifying the dimensional location of the rate cube data, wherein at least part of the at least one rate cube is pre-filled using statistical information related to at least one of the subscriber or the rate plan, wherein the rate cube includes a hash table corresponding to a hash function that utilizes a service identifier associated with a service to which the subscriber has subscribed to generate a key value used to identify the rate cube;

transforming at least one rate model into an optimized form;

generating a usage charge by retrieving the at least one value of pre-computed rate cube data of the at least one rate cube based on a dimensional location for the usage charge, wherein retrieving the at least one value comprises using a first value associated with the at least one usage charge for a first dimension of the dimensional location for the usage charge and using a second value associated with the at least one usage charge for a second dimension of the dimensional location for the usage charge;

combining non-usage charges and the usage charge, wherein the non-usage charges and the usage charge are computed independently; and generating, by the one or more processors, a bill responsive to the request to perform the billing event.

10. The computer-implemented price-generation method of claim 9, wherein analyzing whether rate data may be pre-calculated further comprises identifying a rate and subscriber pair that can be pre-calculated.

11. The computer-implemented price-generation method of claim 10, further comprising pre-calculating the at least one value based at least in part on test data or historical data.

12. The computer-implemented price-generation method of claim 9, wherein the statistical information comprises subscriber usage information.

13. The computer-implemented price-generation method of claim 9, further comprising locating the at least one rate cube using a hash value.

14. The computer-implemented price-generation method of claim 9, wherein combining recurring charges and the usage charge further comprises receiving pre-calculated recurring charge information.

15. The computer-implemented price-generation method of claim 9, further comprising computing in real-time total charge information based at least in part on estimated usage charge data.

16. The computer-implemented price-generation method of claim 9, wherein the at least one rate cube comprises at least one multi-dimensional OLAP cube associated with at least one of a service or subscriber.

17. A non-transitory computer-readable medium having computer-readable instructions stored thereon to cause a computer to execute a process comprising:

receiving a request to perform a billing event;

identifying, from the request to perform the billing event, a subscriber and a rate plan associated with the billing event;

determining that a rate cube for the subscriber or the rate plan does not exist;

analyzing whether rate data may be pre-calculated;

generating, responsive to determining that the rate cube for the subscriber or the rate plan does not exist and that rate data may be pre-calculated, at least one rate cube for storing rate plan information with at least one value as pre-calculated rate cube data at a dimensional location, wherein the at least one rate cube includes a plurality of dimensions for identifying the dimensional location of the rate cube data, wherein at least part of the at least one rate cube is pre-filled using statistical information related to at least one of the subscriber or the rate plan, wherein the rate cube includes a hash table corresponding to a hash function that utilizes a service identifier associated with a service to which the subscriber has subscribed to generate a key value used to identify the rate cube;

transforming at least one rate model into an optimized form;

generating a usage charge by retrieving the at least one value of pre-computed rate cube data of the at least one rate cube based on a dimensional location for the usage charge, wherein retrieving the at least one value comprises using a first value associated with the at least one usage charge for a first dimension of the dimensional location for the usage charge and using a second value associated with the at least one usage charge for a second dimension of the dimensional location for the usage charge;

combining recurring charges and the usage charge, wherein the recurring charges and the usage charge are computed independently; and generating, by the one or more processors, a bill responsive to the request to perform the billing event.

18. The non-transitory computer-readable medium of claim 17, wherein the first set of rules and a second set of rules for the billing component are not synchronized.

19. The non-transitory computer-readable medium of claim 17, wherein the process further comprises pre-calculating the at least one value based at least in part on test data or historical data.

20. The non-transitory computer-readable medium of claim 17, wherein the process further comprises analyzing whether rate data may be pre-calculated further comprises identifying a rate and subscriber pair that can be pre-calculated.

* * * * *